(12) United States Patent
She et al.

(10) Patent No.: US 12,456,977 B2
(45) Date of Patent: Oct. 28, 2025

(54) CONTINUOUS TIME LINEAR EQUALIZERS (CTLES) OF DATA INTERFACES

(71) Applicant: Parade Technologies, Ltd., San Jose, CA (US)

(72) Inventors: Min She, Fremont, CA (US); Kochung Lee, Santa Clara, CA (US)

(73) Assignee: Parade Technologies, Ltd., San Jose, CA (US)

( * ) Notice: Subject to any disclaimer, the term of this patent is extended or adjusted under 35 U.S.C. 154(b) by 0 days.

(21) Appl. No.: 17/885,483

(22) Filed: Aug. 10, 2022

(65) Prior Publication Data
US 2024/0056075 A1 Feb. 15, 2024

(51) Int. Cl.
  *H03K 17/687* (2006.01)
  *H04B 1/12* (2006.01)

(52) U.S. Cl.
  CPC ......... *H03K 17/6874* (2013.01); *H04B 1/123* (2013.01)

(58) Field of Classification Search
  CPC .................. H03K 17/6874; H04B 1/123
  See application file for complete search history.

(56) References Cited

U.S. PATENT DOCUMENTS

| | | | |
|---|---|---|---|
| 8,330,503 B2* | 12/2012 | Chen ................ | H04L 25/03885 327/170 |
| 9,537,681 B1* | 1/2017 | Chan ................ | H04L 25/03012 |
| 11,689,201 B2* | 6/2023 | Dhanasekaran ... | H03K 17/6874 710/316 |

* cited by examiner

*Primary Examiner* — Menatoallah Youssef
*Assistant Examiner* — Colleen J O Toole
(74) *Attorney, Agent, or Firm* — Morgan, Lewis & Bockius LLP

(57) ABSTRACT

An electronic device (e.g., a CTLE circuit of a receiver of a data link) includes a current source and two differential transistor groups. The current source is configured to generate a bias current according to a data rate of data carried by a pair of differential input signals. A subset of the two differential transistor groups is configured to be driven by the bias current to generate a pair of differential output signals from the pair of differential input signals. The two differential transistor groups include a first plurality of transistors receiving a first input signal and a second plurality of transistors receiving a second input signal. The first and second input signals form the pair of differential input signals. In some implementations, each transistor is coupled to a biasing circuit including a DC path coupled to an adjustable biasing voltage level for selecting and deselecting the respective transistor.

20 Claims, 11 Drawing Sheets

CONTINUOUS TIME LINEAR EQUALIZERS (CTLES) OF DATA INTERFACES

TECHNICAL FIELD

This application relates generally to data interface circuits, including but not limited to, methods, devices, and systems for using a continuous time linear equalizer (CTLE) device at a data receiver interface to compensate signal degradation.

BACKGROUND

Many electronic devices or components are physically coupled to each other and communicate with each other using data links and interfaces that comply with high-speed serial computer expansion bus standards. Such data links and interfaces oftentimes include a data serializer on a transmitting side and a data deserializer on a receiving side. A continuous time linear equalizer (CTLE) is also used on the receiving side to equalize signals passing a data link, particularly when the data link communicates data at multiple data rates. However, direct current (DC) operating points of the CTLE can change significantly with the data rates, thereby disabling the CTLE from processing input signals having slightly large amplitudes and causing the CTLE to output distorted signals as the data rate increases to and beyond a certain level. It would be beneficial to have a high-performance CTLE circuit that operates in a stable manner in response to a variation of a data rate of data communicated via a corresponding data link.

SUMMARY

This application is directed to electronic devices, data links, data interfaces, and methods that use a CTLE circuit having a substantially stable DC operating point with respect to a plurality of data rates (e.g., 4 or 8 billions of bits per second (Gbps)). A bias current of the CTLE circuit is adjusted according to a data rate, so is a size of an input device. The higher the data rate is, the larger the bias current and the size of the input device are. Particularly, the size of the input size is selected according to each data rate, such that the operating point of the CTLE circuit remains substantially stable across the plurality of data rates. The substantially stable operating point guarantees a consistency of performance of the CTLE circuit including a consistent safety margin between a normal signal level and a clipping level across the plurality of data rates (e.g., associated with a Peripheral Component Interconnect Express (PCIe) electrical interface).

In one aspect, an electronic device includes a current source and two differential transistor groups coupled to the current source. The current source is configured to generate a bias current in accordance with a data rate of data carried by a pair of differential input signals. A subset of the two differential transistor groups is configured to be driven by the bias current to generate a pair of differential output signals from the pair of differential input signals. The two differential transistor groups include a first plurality of transistors configured to receive a first input signal and a second plurality of transistors configured to receive a second input signal, and the first and second input signals form the pair of differential input signals.

In another aspect, a method is implemented at an electronic device. The method includes based on a data rate of data carried by a pair of differential input signals, generating a bias current and selecting a subset of two differential transistor groups to be driven by the bias current. The two differential transistor groups include a first plurality of transistors and a second plurality of transistors. The method further includes receiving a first input signal by the first plurality of transistors and receiving a second input signal by the second plurality of transistors. The first and second input signals form the pair of differential input signals. The method further includes generating, by the selected subset of the two differential transistor groups, a pair of differential output signals from the pair of differential input signals based on the data rate.

In yet another aspect, a method is implemented to provide an electronic device. The method includes providing a current source configured to generate a bias current in accordance with a data rate of data carried by a pair of differential input signals and providing two differential transistor groups coupled to the current source and configured to select a subset of the two differential transistor groups to be driven by the bias current and generate a pair of differential output signals from the pair of differential input signals based on the data rate. Providing the two differential transistor groups further includes providing a first plurality of transistors configured to receive a first input signal and providing a second plurality of transistors configured to receive a second input signal. The first and second input signals form the pair of differential input signals.

These illustrative embodiments and implementations are mentioned not to limit or define the disclosure, but to provide examples to aid understanding thereof. Additional implementations are discussed in the Detailed Description, and further description is provided there.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Various implementations of this application are directed to electronic devices, data links, and data interfaces, and methods that use a CTLE circuit having adjustable input device sizes to maintain substantially stable operating points. A bias current of the CTLE circuit is adjusted according to a data rate, so is a size of an input device of the CTLE circuit. Specifically, the higher the data rate is, the larger the bias current and the size of the input device are. Particularly, the size of the input size is selected according to each data rate. This keeps the operating point substantially stable with respect to a plurality of data rates (e.g., associated with a PCIe electrical interface). The substantially stable operating point guarantees a consistency of performance of the CTLE circuit (e.g., a consistent safety margin between a normal signal level and a clipping level) across the plurality of data rates.

Figure 1:
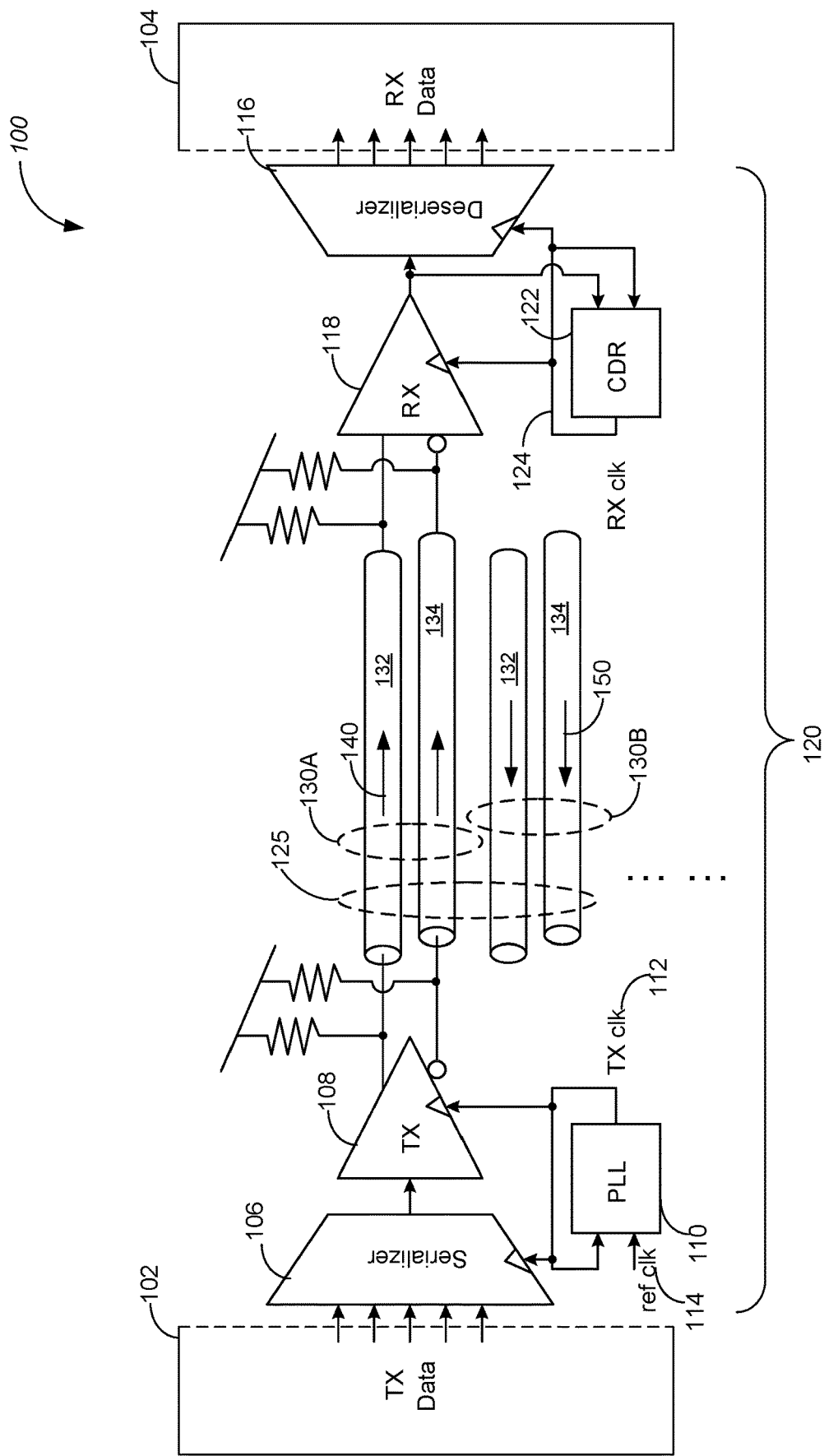
FIG. 1 is a schematic diagram of an example electronic system in which a first electronic device or component is electrically coupled to a second electronic device or component via a data link, in accordance with some implementations.

FIG. 1 is a schematic diagram of an example electronic system 100 in which a first electronic device or component 102 is electrically coupled to a second electronic device or component 104 via a data link 120, in accordance with some implementations. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 120 includes a connection port for receiving from the second electronic device 104. The connection port is optionally formed on a mother board of the personal computer. In some implementations, the data link 120 complies with PCI Express (i.e., PCIe), which is a high-speed serial computer expansion bus standard and provides an interface to communicate data packets between the first and second electronic devices 102 and 104 in compliance with the PCI Express. The data link 120 is a serial data bus including one or more data channels 125. Each data channel 125 includes two wire sets 130A and 130B for transmitting and receiving data packets, respectively, thereby supporting full-duplex communication between the first and second electronic devices 102 and 104. In some examples, the data link 120 has 1, 4, 8, or 16 channels coupled in a single data port of the data link 120. For each data channel 125, the two wire sets 130A and 130B correspond to a downstream data direction 140 or an upstream data direction 150 defined with respect to the first electronic device 102. Optionally, each wire set 130A or 130B includes two respective wires 132 and 134 for carrying a pair of differential signals.

In some implementations, the first electronic device 102 includes or is coupled to a root complex device (not shown) that is further coupled to the data link 120. The root complex device is configured to generate requests for transactions including a series of one or more packet transmissions on behalf of the first electronic device 102. Examples of the transactions include, but are not limited to, Memory Read, Memory Read Lock, IO Read, IO Write, Configuration Read, Configuration Write, and Message. In some implementations, the first electronic device 102 is coupled to one or more additional electronic devices besides the second electronic device 104. The data link 120 includes one or more switch devices to couple the root complex device of the first electronic device 102 to multiple endpoints including the second electronic device 104 and additional electronic devices not shown in FIG. 1.

A data transmission protocol (e.g., PCI Express) is established based on a layered model including an application layer, a transaction layer, a data link layer, and a physical layer. As the top layer, the application layer is implemented in software programs, such as Ethernet, NVMe, SOP, AHCI, and SATA. In the transaction layer, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer. The physical layer controls link training and electrical (analog) signaling, and includes a logical block and an electrical block. The logic block defines ordered data sets in training states, and the electrical block defines eye diagram characteristics and analog waveforms. Each layer of the layered model includes first specifications for a transmitting side where a root complex device is coupled and second specifications for a receiving side where a peripheral component (i.e., the second electronic device 104) is coupled.

As signals are transmitted within the wire sets 130 of each data channel 125 of the data link 120, the signals are distorted and spread over sequential symbols and result in inter symbol interferences (ISI) and bit errors at the receiving side of the second electronic device 104. In some implementations, these ISI and bit errors can be suppressed by a finite impulse response (FIR) driver that is coupled serially on a path of the data link 120 and configured with equalization settings using an equalization procedure. The equalization procedure is implemented when a high speed data transfer rate needs to be initialized, when an equalization request is issued from the application layer, or when a bit error rate (BER) exceeds a data error tolerance.

The electronic system 100 includes a serializer and deserializer (SERDES) system corresponding to the data link 120. The SERDES system of the data link 120 includes a serializer 106, a transmitter 108, a data channel 125, a receiver 118, and a deserializer 116. The serializer 106 converts parallel data of the first electronic device 102 to serial data. The transmitter 108 sends the serial data to the data channel 125. The receiver 118 processes the serial data and send the processed serial data to the deserializer 116, which converts the serial data back to the parallel data for the second electronic device 104. In some implementations, the receiver 118 includes an FIR driver. On the transmitting side, a phase lock loop 110 generates a transmitter clock signal 112 based on a reference clock 114, and the transmitter clock signal 112 is applied to control serialization of the data to be transmitted by the data channel 125 of the data link 120. On the receiving side, a clock data recovery (CDR) circuit 122 is used to recover a receiver clock signal 124 from the serial data received via the data channel 125 and compensate signal amplitudes due to the loss in this data channel 125 and other factors. The receiver clock signal 124 is used with the receiver 118 and deserializer 116 to condition the serial data received via the data channel 126 and regenerate the parallel data from the serial data. During this process, the receiver 118 is configured to reduce signal distortion, data spreading over sequential symbols, inter symbol interferences, and resulting bit errors of the serial data on the receiving side of the second electronic device 104.

Figure 2A:
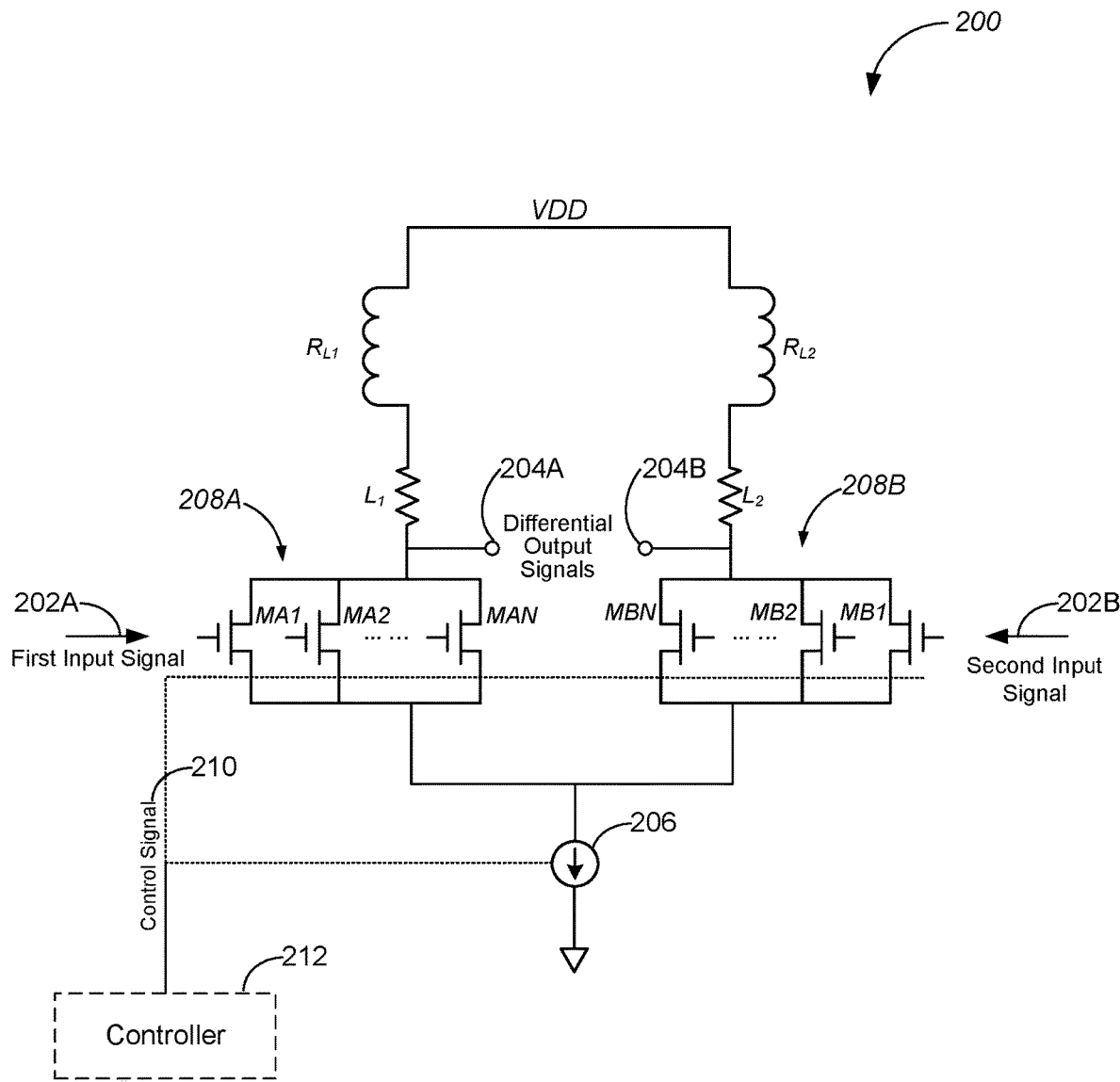
FIGS. 2A and 2B are schematic diagrams of two example continuous time linear equalizer (CTLE) circuits, in accordance with some implementations.
Figure 2B:
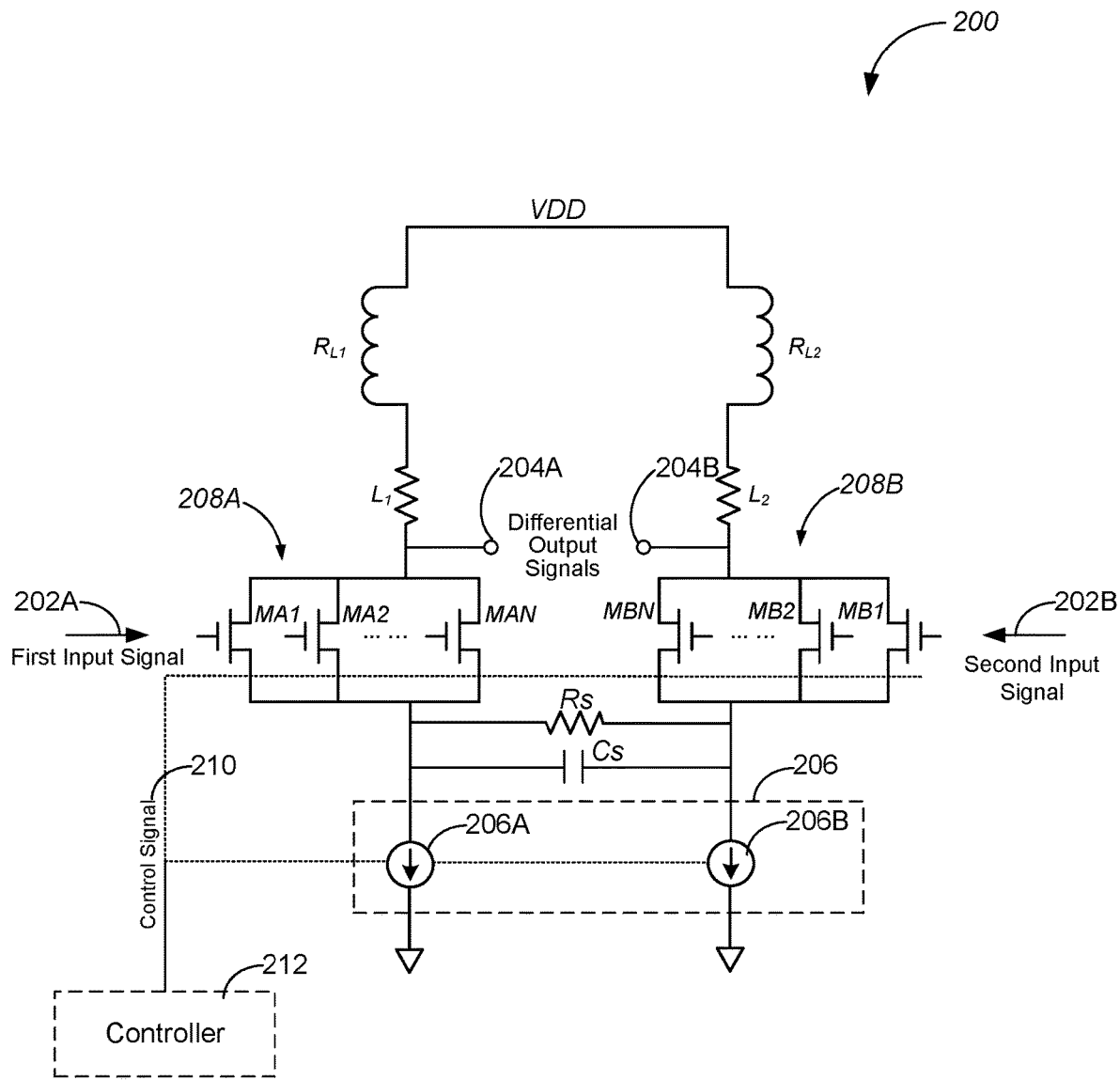
Figure 2C:
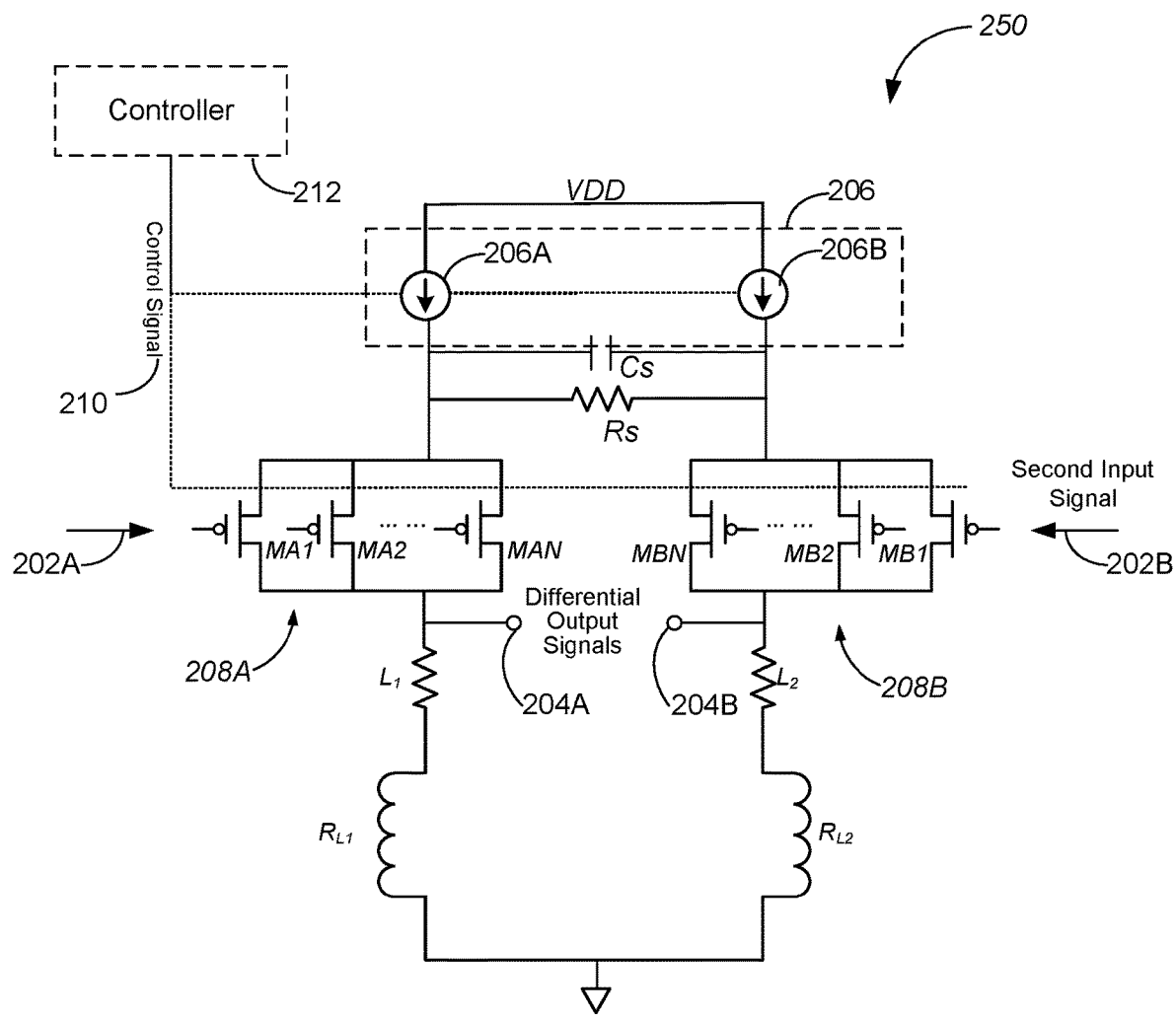
FIG. 2C is a schematic diagram of another example CTLE circuit, in accordance with some implementations.

FIGS. 2A and 2B are schematic diagrams of two example continuous time linear equalizer (CTLE) circuits 200, in accordance with some implementations. FIG. 2C is a schematic diagram of another example CTLE circuit 250, in accordance with some implementations. The CTLE circuit 250. A receiver 118 is coupled at a receiving side of a second electronic device 104, and includes a CTLE circuit 200 or 250. The CTLE circuit is configured to receive a pair of differential input signals 202A and 202B and generate differential output signals 204A and 204B. One or both of the differential output signals 204A and 204B are further processed by the receiver 118 and deserialized by a deserializer 116 with reference to a receiver clock signal 124. In some situations, the CTLE circuit 200 or 250 is used to compensate a signal amplitude compromised by a lossy data channel 125 or other factors.

The CTLE circuit 200 or 250 includes a current source 206 and two differential transistor groups 208A and 208B coupled to the current source 206. The current source 206 generates a bias current in accordance with a data rate of data carried by the pair of differential input signals 202A and 202B. In some implementations, the current source 206 is controlled by a control signal 210, and the control signal 210 is configured to select a subset of the two differential transistor groups 208A and 208B based on the data rate as well. The subset of the two differential transistor groups 208A and 208B is configured to be driven by the bias current to generate the pair of differential output signals 204A and 204B from the pair of differential input signals 202A and 202B. The two differential transistor groups 208A and 208B further include a first plurality of transistors 208A (MA1, MA2, . . . MAN) configured to receive a first input signal 202A and a second plurality of transistors 208B (MB1, MB2, . . . MBN) configured to receive a second input signal 202B. The first and second input signals form the pair of differential input signals 202A and 202B. The first plurality of transistors 208A are configured to output a first output signal 204A, and the second plurality of transistors 208B are configured to output a second output signal 204B. The first and second output signals 204A and 204B form the pair of differential output signals. The CTLE circuit 200 or 250 is implemented using N-type MOSFETs or P-type MOSFETs in the differential transistor groups, respectively.

In some implementations, the first plurality of transistors 208A are arranged in parallel, and the second plurality of transistors 208B are arranged in parallel. Sources of the first plurality of transistors 208A are shorted to each other, and drains of the first plurality of transistors 208A are shorted to each other. Sources of the second plurality of transistors 208B are shorted to each other, and drains of the first plurality of transistors 208B are shorted to each other. Each of gates of the first plurality of transistors 208A is electrically coupled to the first input signal 202A via a respective first biasing circuit (e.g., 402A-i in FIG. 4). Each of gates of the second plurality of transistors 208B is electrically coupled to the second input signal 202B via a respective second biasing circuit (e.g., 402B-i in FIG. 4).

Referring to FIG. 2A, in some embodiments, the sources of the first plurality of transistors 208A, sources of the second plurality of transistors 208B, and current source 206 are directly coupled to each other. In some implementations not shown, the current source 206 includes a plurality of current source components. Each current source component is configured to provide a respective bias current portion when the respective current component is enabled by the control signal 210. Alternatively, referring to FIG. 2B, in some implementations, the sources of the first plurality of transistors 208A are coupled to the sources of the second plurality of transistors 208B via a source resistor Rs, source capacitor Cs, or both. For example, the source resistor Rs and source capacitor Cs are coupled in parallel with each other and between the sources of the transistors 208A and sources of the transistors 208B. The current source 206 includes a first current source 206A and a second current source 206B, which are directly coupled to the sources of the transistors 208A and sources of the transistors 208B, respectively.

In some implementations, the drains of the first plurality of transistors 208A are coupled to a first drain resistor $R_{L1}$, a first drain inductor $L_1$, or both. The drains of the second plurality of transistors 208B are coupled to a second drain resistor $R_{L2}$, a second drain inductor $L_2$, or both. For example, the first drain resistor $R_{L1}$ and first drain inductor $L_1$ are coupled in series with each other and between the drains of the transistors 208A and a power supply voltage (e.g., VDD in FIGS. 2A-2B, ground in FIG. 2C), so are the second drain resistor $R_{L2}$ and second drain inductor $L_2$ coupled in series with each other and between the drains of the transistors 208B and a power supply voltage (e.g., VDD in FIGS. 2A-2B, ground in FIG. 2C). Resistances of the drain resistors $R_{L1}$ and $R_{L2}$ are equal to each other, so are inductances of the drain inductors $L_1$ and $L_2$ equal to each other.

The two differential transistor groups 208A and 208B are substantially identical to each other. The two differential transistor groups 208A and 208B have the same number of transistors and are coupled to drain inductors $L_1$ and $L_2$ having the same inductances or drain resistors $R_{L1}$ and $R_{L2}$ having the same resistances. In some implementations (FIG. 2B), The two differential transistor groups 208A and 208B are driven by separate current sources 206A and 206B that provide the same level of bias current. Each of the first plurality of transistors 208A corresponds to, has the same size with, and is selected and deselected concurrently with, a respective transistor of the second plurality of transistors 208B.

In some implementations, the CTLE circuit 200 or 250 includes or is coupled to a controller 212 configured to generate the control signal 210 based on a data rate of the data carried by the pair of differential input signals 202A and 202B. The control signal 210 is configured to enable a subset of the current source 206, the subset of the two differential transistor groups 208A and 208B, or both, such that the pair of differential output signals 204A and 204B are generated from the pair of differential input signals 202A and 202B based on the data rate of the data carried by the pair of differential input signals 202A and 202B. For example, the control signal 210 has two bits and is configured to enable four distinct levels for the bias current and select four distinct subsets of the two differential transistor groups 208A and 208B. In an example, the lowest data rate is 1 Gbps, and the lowest one of the four distinct levels (e.g., 1 mA) is enabled by the control signal 210 and outputted by the current source 206. A first subset of transistors (e.g., transistors MA1 and MB1) is selected and enabled to generate the differential output signals 204A and 204B from the differential input signals 202A and 202B. In another example, the highest data rate is 16 Gbps, and the highest one of the four distinct levels (e.g., 16 mA) is enabled by the control signal 210 and outputted by the current source 206. A second subset of transistors (e.g., all of the transistors MA1-MAN and MB1-MBN) is selected and enabled to generate the differential output signals 204A and 204B from the differential input signals 202A and 202B. For example, a sum of transistor sizes W/L of transistors MA1-MAN is 16 times of a transistor size W/L of transistor MA1. By these means, each of the first plurality of transistors 208A and the second plurality of transistors 208B in the two differential transistor groups 208A and 208B is configured to maintain substantially constant DC operating points independently of the data rate.

FIGS. 3A-3D are schematic diagrams of example transistor groups 208 for receiving an input signal of a CTLE circuit 200 or 250, in accordance with some implementations. Each transistor group 208 includes a plurality of transistors and is used twice in the CTLE circuit 200 or 250 to form two differential transistor groups 208A and 208B (in FIGS. 2A-2C). In accordance with a data rate of data carried by a pair of differential input signals, a subset of the two differential transistor groups 208A and 208B is controlled (e.g., selected by a control signal 210) to be driven by a bias current. A pair of differential output signals 204A and 204B are generated from the two differential transistor groups 208A and 208B, i.e., a respective output signal 204A or 204B is generated for a respective transistor group 208A or 208B. Particularly, when the subset of the two differential transistor groups 208A and 208B is controlled to generate the differential output signals 204A and 204B, the subset of the transistor groups 208A and 208B includes a first subset of the first plurality of transistors 208A and a second subset of the second plurality of transistors 208B that are identical to the first subset of the first plurality of transistors 208A.

Gates of the plurality of transistors of each transistor group 208 are coupled to each other. In some implementations, sources of the plurality of transistors of each transistor group 208 are coupled to each other and further to a current source 206 or sources of the plurality of transistors of another transistor group 208. In some implementations, drains of the plurality of transistors of each transistor group 208 are coupled to each other. Alternatively, in some implementations (FIG. 6A), a source of each transistor MA-i of a transistor group 208A is coupled to a source of a corresponding transistor MB-i of another transistor group 208B and a current source component 206-i, but not directly coupled to a source of any remaining transistor of the same transistor group 208A. Alternatively, in some implementations not shown, drains of the plurality of transistors of each transistor group 208 are not directly coupled to each other. A drain of each transistor is coupled in series with a respective portion of a drain resistor $R_L$, a respective portion of a drain inductor L, or both.

Each transistor group 208 includes a respective number (e.g., N) of transistors that are coupled in parallel to each other, e.g., transistors M1, M2, M3, M4, . . . and MN, where N is a positive integer greater than 1. In an example, N is equal to 2, and each transistor group 208 has two transistors. Each of the transistors M1-MN has a predefined transistor size, i.e., a ratio between a transistor width and a transistor length. A total size of the selected subset of each transistor group 208A or 208B matches the bias current provided by the current source 206 and the data rate of the differential input signals 202A and 202B. In an example, both the bias current provided by the current source 206 and the total size of the selected subset of each transistor group 208A or 208B are linearly scaled with the data rate of the differential input signals 202A and 202B. Each transistor has a transistor size, and the total size of the selected subset is a sum of the transistor sizes of selected transistors.

Figure 3A:
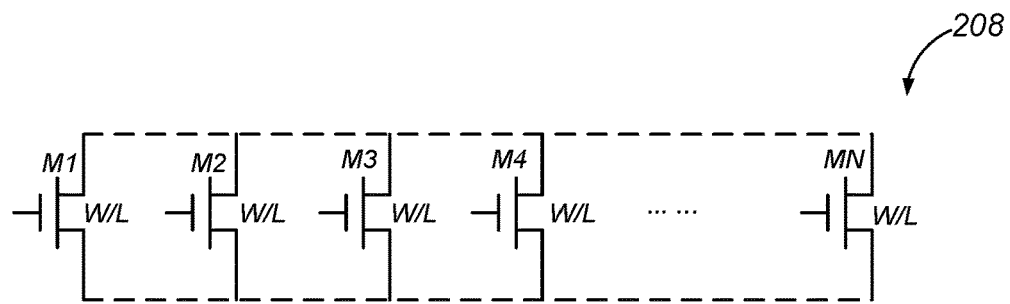
FIGS. 3A-3D are schematic diagrams of example transistor groups for receiving an input signal of a CTLE circuit, in accordance with some implementations.

Referring to FIG. 3A, in some implementations, all transistors in the two differential transistor groups 208A and 208B have the same transistor size W/L. For a first data rate $D_1$, a first number ($N_1$) of transistors of each transistor group 208 are selected. A second data rate $D_2$ is scaled from the first data rate $D_1$ by a scale value S (e.g., equal to 4), and a second number ($N_2$) of transistors of each transistor group 208 are selected to generate the differential output signals 204A and 204B. The second number ($N_2$) is also scaled from the first number ($N_1$). In an example, the first and second data rates are 1 Gbps and 4 Gbps, respectively, and one transistor and four transistors of each transistor group 208 are selected to enable the data rates of 1 Gbps and 4 Gbps, respectively.

Figure 3B:
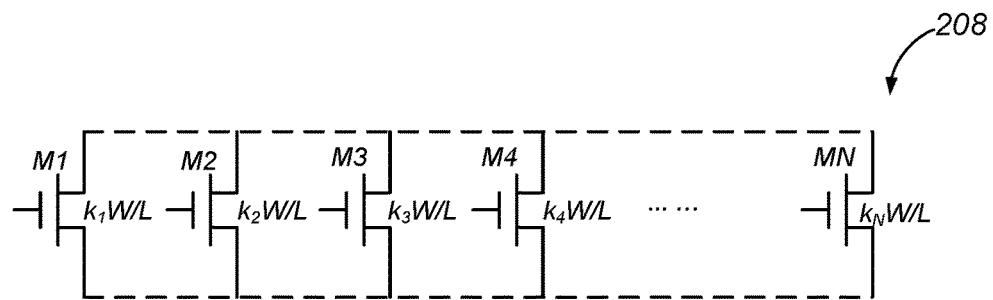

In some implementations, each of the plurality of transistors M1-MN of a transistor group 208 has a respective distinct transistor size, independently of remaining transistor(s) of the same transistor group 208. Referring to FIG. 3B, in some implementations, the CTLE circuit 200 or 250 is configured to convert a plurality of predefined data rates $D_1$-$D_N$. Each transistor group 208 includes N transistors M1-MN that are coupled in parallel to each other. The N transistors M1-MN have sizes $k_1 W/L$, . . . , and $k_N W/L$, which are scaled according to the plurality of predefined data rates $D_1$-$D_N$. For each data rate $D_i$, a single transistor $M_i$ is selected to generate the differential output signals 204A and 204B. In some implementations, each single transistor $M_i$ of the N transistors M1-MN includes a transistor having a corresponding transistor size $k_i W/L$. In some implementations not shown, a 1 transistor $M_i$ of the N transistors M1-MN includes a set of component transistors of the same size (e.g., W/L). For example, a transistor having a transistor size 2 W/L includes two parallel component transistors both having a transistor size W/L.

Figure 3C:
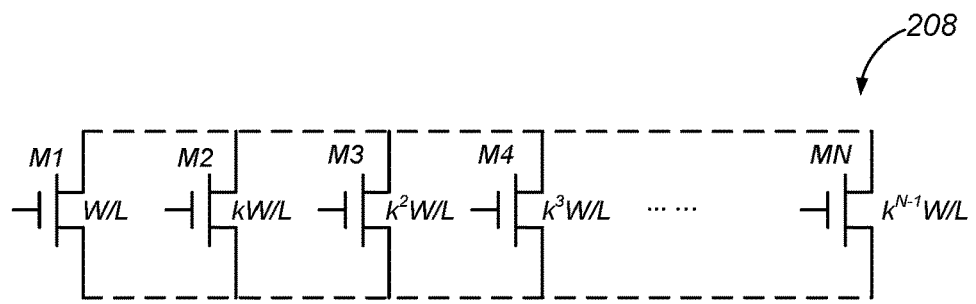
Figure 3D:
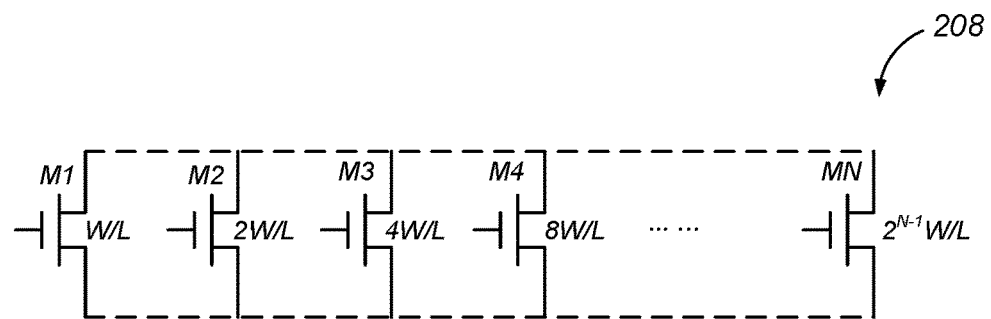

Referring to FIG. 3C, in some implementations, each transistor group 208 includes N transistors M1-MN that are coupled in parallel to each other. The sizes of the transistors M1-MN of each transistor group 208 form a geometric sequence having a scale factor k, and are equal to W/L, kW/L, $k^2$W/L, $k^3$W/L, . . . , $k^{N-1}$W/L, where N represents the number of transistors in the respective transistor group 208 and is greater than 1 (i.e., equal to 2 or more). For each data rate, one or more transistors of each transistor group 208A or 208B are selected to generate the differential output signals 204A and 204B. A sum of transistor sizes of the one or more selected transistors is determined by a corresponding data rate of the data carried by the pair of differential input signals 202A and 202B. Referring to FIG. 3D, in some implementations, k is equal to 2, and a subset of transistors of each transistor group 208A or 208B is selected based on a binary scheme, such that a total size of the selected subset of transistors matches the bias current and the data rate. In an example, each transistor group 208A or 208B includes 5 transistors (M1-M5) having transistors sizes W/L, 2 W/L, 4 W/L, 8 W/L, and 16 W/L. A first data rate is 1 Gbps, and only the smallest transistor M1 having a transistor size W/L is selected. A second data rate is 13 Gbps, and transistors M1, M3 and M4 having transistor sizes W/L, 4 W/L, and 8 W/L are selected to provide a total transistor size 13 W/L. In total, the N transistors in FIG. 3C or 3D can provide $2^{N-1}$ combinations of transistors corresponding to $2^{N-1}$ discrete data rates. As such, the transistor group 208 including N transistors M1-MN is applied to enable up to $2^{N-1}$ discrete data rates.

In some implementations, all transistors in the two differential transistor groups 208A and 208B have the same transistor lengths L. Alternatively, in some implementations, each transistor in the two differential transistor groups 208A and 208B have a respective transistor length. A first subset of transistors have transistor lengths, e.g., 2L, distinct from a second subset of transistors having the transistor length L. In some implementations, a transistor M1, M2, . . . or MN includes one or more identical component transistors that are electrically coupled in parallel to each other. Drains of the one or more identical component transistors are shortened to each other, and sources of the one or more identical component transistors are shorted to each other. Gates of one or more identical component transistors are shorted to each other. Each component transistor has a basic transistor size W/L. For example, a transistor having a transistor size 4W/L include 4 component transistors each having the basic transistor size W/L.

Figure 4:
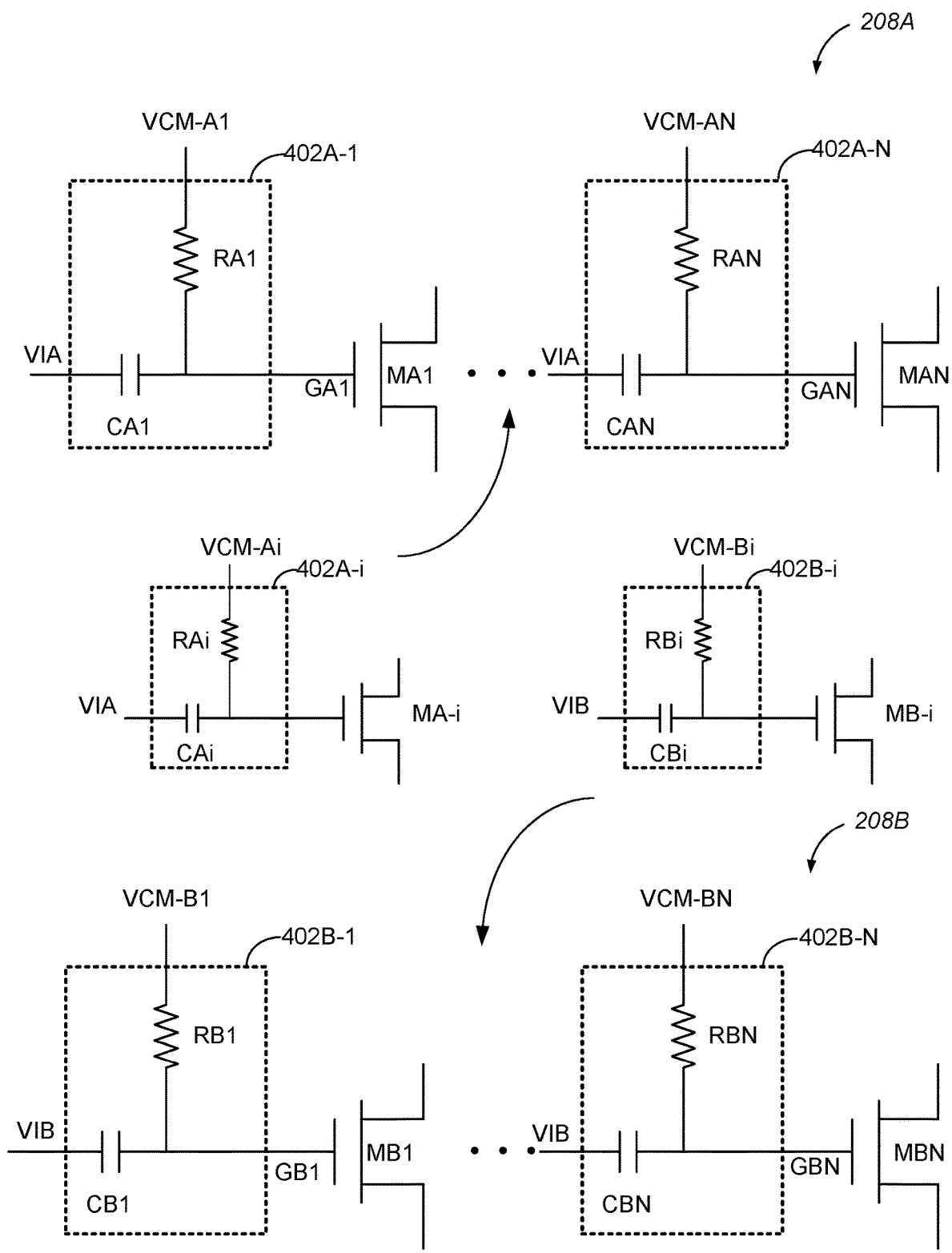
FIG. 4 is a schematic diagram of two differential transistor groups that are coupled to biasing circuit groups for receiving a pair of differential input signals of a CTLE circuit, in accordance with some implementations.

FIG. 4 is a schematic diagram of two differential transistor groups 208A and 208B that are coupled to biasing circuit groups 402A and 402B for receiving a pair of differential input signals 202A and 202B of a CTLE circuit 200 or 250, in accordance with some implementations. Specifically, each of a first plurality of transistors of a transistor group 208A is coupled to a respective biasing circuit 402-*i* of a first biasing circuit group 402A, and each of a second plurality of transistors of a transistor group 208B are coupled to a respective biasing circuit 402B-i of a second biasing circuit group 402B. For example, a first transistor MA1 or MB1 is coupled to a first biasing circuit 402A-1 or 402B-1, respectively. An N-th transistor MAN or MBN is coupled to an N-th biasing circuit 402A-N or 402B-N, respectively. An i-th transistor MA-i or MB-i is coupled to an i-th biasing circuit 402A-i or 402B-i, respectively.

Each biasing circuit 402A-i or 402B-i includes a biasing resistor RAi or RBi and a capacitor CAi or CBi, where i is equal to 1, . . . , or N. Each biasing circuit of the biasing circuit groups 402A and 402B is coupled to a common mode voltage VCM-Ai or VCM-Bi via the biasing resistor RAi or CBi, and configured to receive an input signal 202A (VIA) or 202B (VIB) via the capacitor CAi or CBi, respectively. In some implementations, the biasing resistors applied in the biasing circuit groups 402A and 402B have equal resistances. In some implementations, the biasing capacitors applied in the biasing circuit groups 402A and 402B have equal capacitances. Alternatively, in some implementations, the biasing resistor and biasing capacitor applied in each biasing circuit 402A-i or 402B-i of the biasing circuit groups 402A and 402B is selected based on a transistor size of a transistor MA-i or MB-i coupled to the respective biasing circuit.

Stated another way, the biasing circuit groups 402A and 402B include a plurality of biasing circuits 402A-i and 402B-i, which are coupled to individual transistors of the two differential transistor groups 208A and 208B, respectively. Each biasing circuit 402A-i or 402B-i is coupled to a respective one of the first plurality of transistors 208A and the second plurality of transistors 208B. Each biasing circuit 402A-i or 402B-i further includes a DC path coupled to a DC bias voltage source (e.g., 500 in FIG. 5) for a respective transistor MA-i or MB-i, and an input path coupled to a respective one of two input signals 202A (VIA) and 202B (VIB). The DC bias voltage source provides the respective common mode voltage VCM-Ai or VCM-Bi, and the DC path includes the biasing resistor RAi or RBi. The input path includes the biasing capacitor CAi or CBi. More specifically, in some implementations, in each biasing circuit 402A-i or 402B-i, the biasing resistor RAi or RBi is coupled between a gate of a respective transistor MA-i or MB-i and the DC bias voltage source that provides the common mode voltage VCM-Ai or VCM-Bi, and the biasing capacitor CAi or CBi is coupled between the gate of the respective transistor MA-i or MB-i and the respective one of two input signals 202A (VIA) and 202B (VIB).

Figure 5:
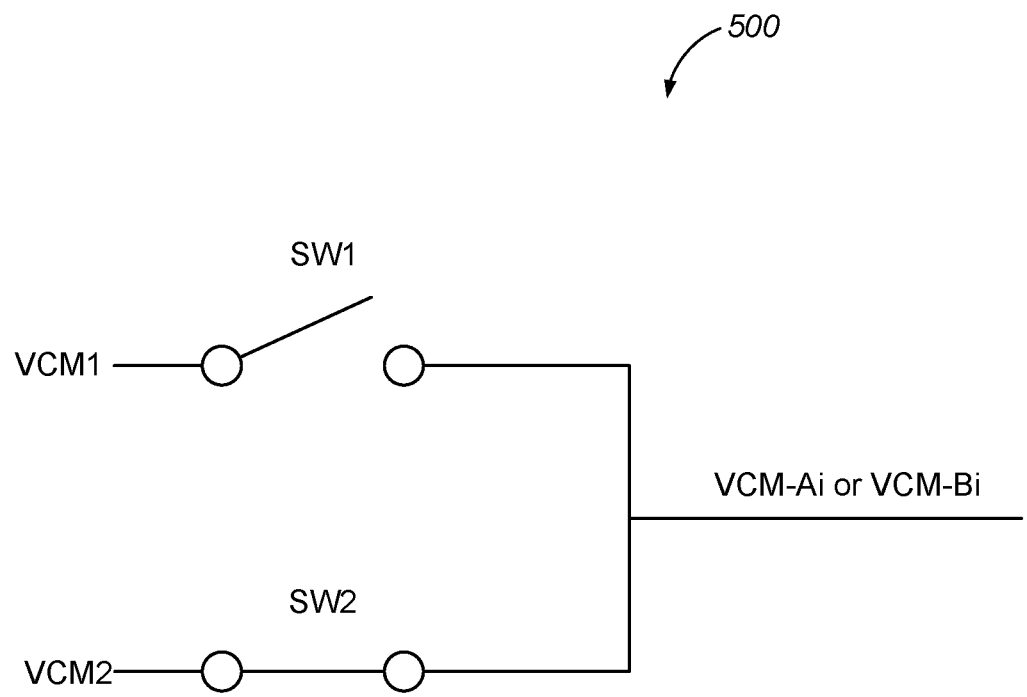
FIG. 5 is a schematic diagram of a DC bias voltage source applied to provide an adjustable biasing voltage (i.e., a common mode voltage) to a biasing circuit of a CTLE circuit, in accordance with some implementations.

FIG. 5 is a schematic diagram of a DC bias voltage source 500 applied to provide an adjustable biasing voltage (i.e., the common mode voltage VCM-Ai or VCM-Bi) to a biasing circuit 402A-i or 402B-i of a CTLE circuit 200 or 250, in accordance with some implementations. Each biasing circuit of the biasing circuit groups 402A and 402B includes a DC path coupled to the DC bias voltage source 500, and the DC bias voltage source 500 provides the adjustable biasing voltage VCM-Ai or VCM-Bi. In some implementations, the DC bias voltage source 500 includes two biasing voltage levels VCM1 and VCM2. An output of the DC bias voltage source 500 is electrically coupled to the two biasing voltage levels VCM1 and VCM2 via separate switches SW1 and SW2, respectively. In some implementations, a control signal 210 (FIGS. 2A and 2B) is applied to control the switches SW1 and SW2 jointly with the current source 206.

When a respective transistor MA-i or MB-i biased by the biasing circuit 402A-i or 402B-i receives a first biasing voltage level VCM1, the transistor MA-i or MB-i operates to generate an output signal 204A or 204B. Conversely, when a respective transistor MA-i or MB-i biased by the biasing circuit receives a second biasing voltage level VCM2, the transistor MA-i or MB-i are disabled from generating the output signal 204A or 204B from the input signal 202A or 202B. In an example, the first biasing voltage level VCM1 is equal to 0.6V, and the second biasing voltage level VCM2 is equal to 0.4V. As the gate of the respective transistor MA-i or MB-i is biased at the first biasing voltage level VCM1, the respective transistor MA-i or MB-i is turned on and functions in a saturation region to generate the output signal 204A or 204B. Conversely, as the gate of the respective transistor MA-i or MB-i is biased at the second biasing voltage level VCM2, the respective transistor MA-i or MB-i is not turned on to operate in a corresponding linear or saturation region, i.e., a gate-to-source voltage drop does not exceed a threshold voltage of the respective transistor MA-i or MB-i.

Stated another way, in some implementations, the biasing voltage levels VCM1 and VCM2 are selected based on the threshold voltage and operating point (e.g., a source voltage) of the respective transistor MA-i or MB-i. The first biasing voltage level VCM1 is sufficient high to make the respective transistor MA-i or MB-i operate in the saturation region, and the second biasing voltage level VCM2 is sufficient low to turn off the respective transistor MA-i or MB-i.

As explained above, a subset of the two differential transistor groups 208A and 208B is selected to be driven by the bias current to generate the differential output signals 204A and 204B. Each transistor of the transistor groups 208A and 208B is configured to be selected when the DC bias voltage source 500 of the respective biasing circuit 402A-i or 402B-i is electrically coupled to a first predefined biasing voltage level VCM1, and deselected when the DC bias voltage source 500 of the respective biasing circuit 402A-i or 402B-i is electrically coupled to a second predefined biasing voltage level VCM2. The second predefined biasing voltage level VCM2 is distinct from the first predefined biasing voltage level VCM1. For each of the subset of the transistor groups 208A and 208B, the DC bias voltage source 500 of the corresponding biasing circuit 402A-i or 402B-i is electrically coupled to the first predefined biasing voltage level VCM1. For each remaining transistor that is external to the subset of the transistor groups 208A and 208B, the DC bias voltage source 500 of the respective biasing circuit 402A-i or 402B-i is electrically coupled to the second predefined biasing voltage level VCM2.

In some implementations, each transistor in the two differential transistor groups 208A is an N-type MOSFET. The first predefined biasing voltage level VCM1 is higher than the second predefined biasing voltage VCM2. The first predefined biasing voltage level VCM1 turns on the respective transistor, while the second predefined biasing voltage VCM2 is configured to turn off the respective transistor. Alternatively, in some implementations (FIG. 2C), each transistor of the two differential transistor groups 208A is a P-type MOSFET. The first predefined biasing voltage level VCM1 is lower than the second predefined biasing voltage VCM2. The first predefined biasing voltage level VCM1 turns on the respective transistor, while the second predefined biasing voltage VCM2 configured to turn off the respective transistor.

In some implementations, the control signal 210 (FIGS. 2A and 2B) is applied to control the two switches SW1 and SW2 to connect an output of the DC bias voltage source 500 to one of the two biasing voltage levels VCM1 and VCM2. At any time, only one of the two switches SW1 and SW2 is enabled. If the switch SW1 is enabled, the output of the DC bias voltage source 500 provides the biasing voltage level VCM1 to the respective biasing circuit 402A-i or 402B-i. If the switch SW2 is enabled, the output of the DC bias voltage source 500 provides the biasing voltage level VCM2 to the respective biasing circuit 402A-i or 402B-i. In some implementations, the switch SW1 is enabled for a first duration of time, and the switch SW2 is enabled for a second duration of time that follows the first duration of time. Alternatively, in some implementations, the switch SW2 is enabled for a first duration of time, and the switch SW1 is enabled for a second duration of time that follows the first duration of time. In both of these implementations, a start of the second duration of time is separated from an end of the first duration of time by at least a tristate time (e.g., 20 ns) during which both of the switches SW1 and SW2 are turned off.

Figure 6A:
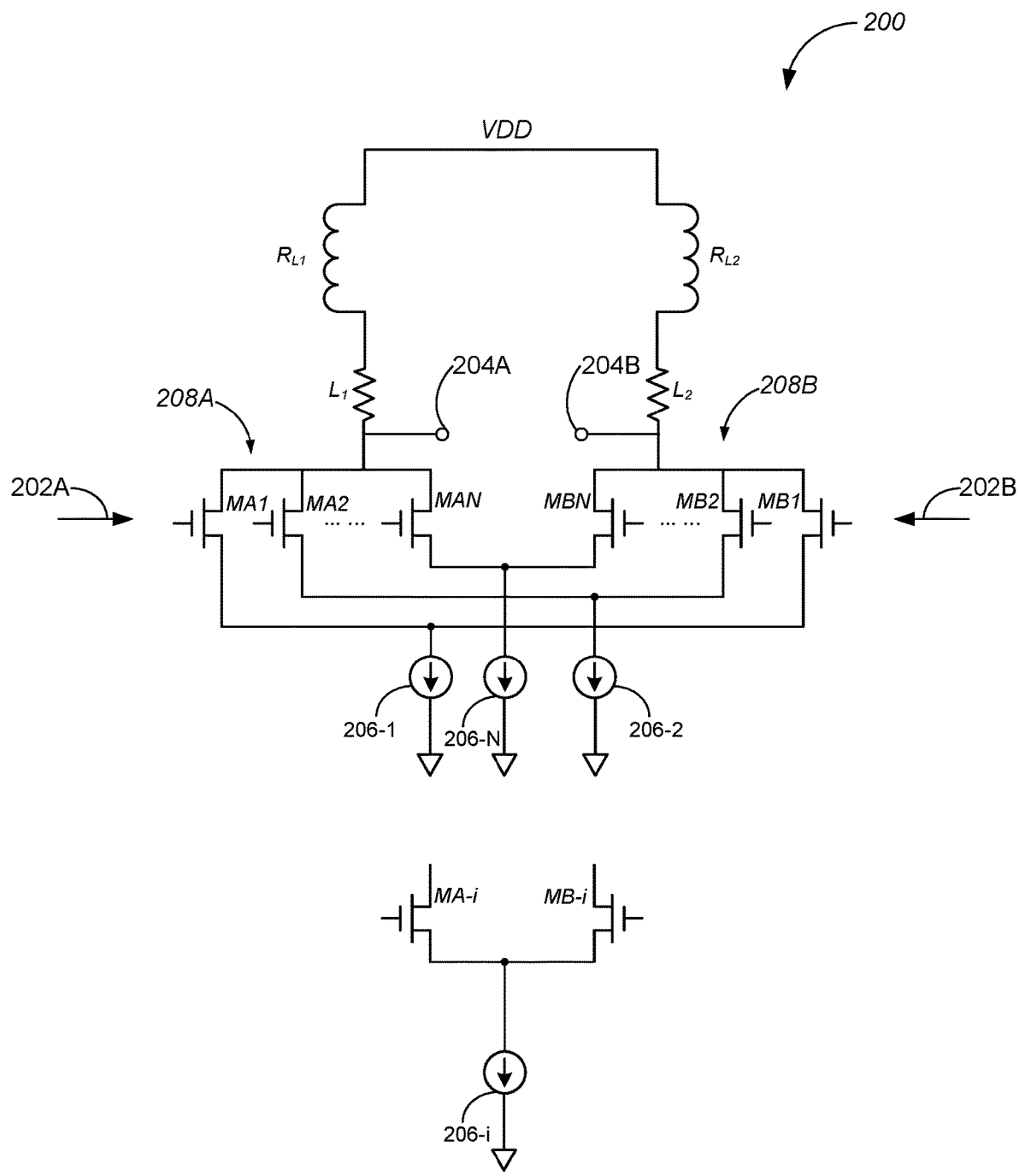
FIGS. 6A and 6B are schematic diagrams of two example CTLE circuit including separate current source components for input transistors, in accordance with some implementations.
Figure 6B:
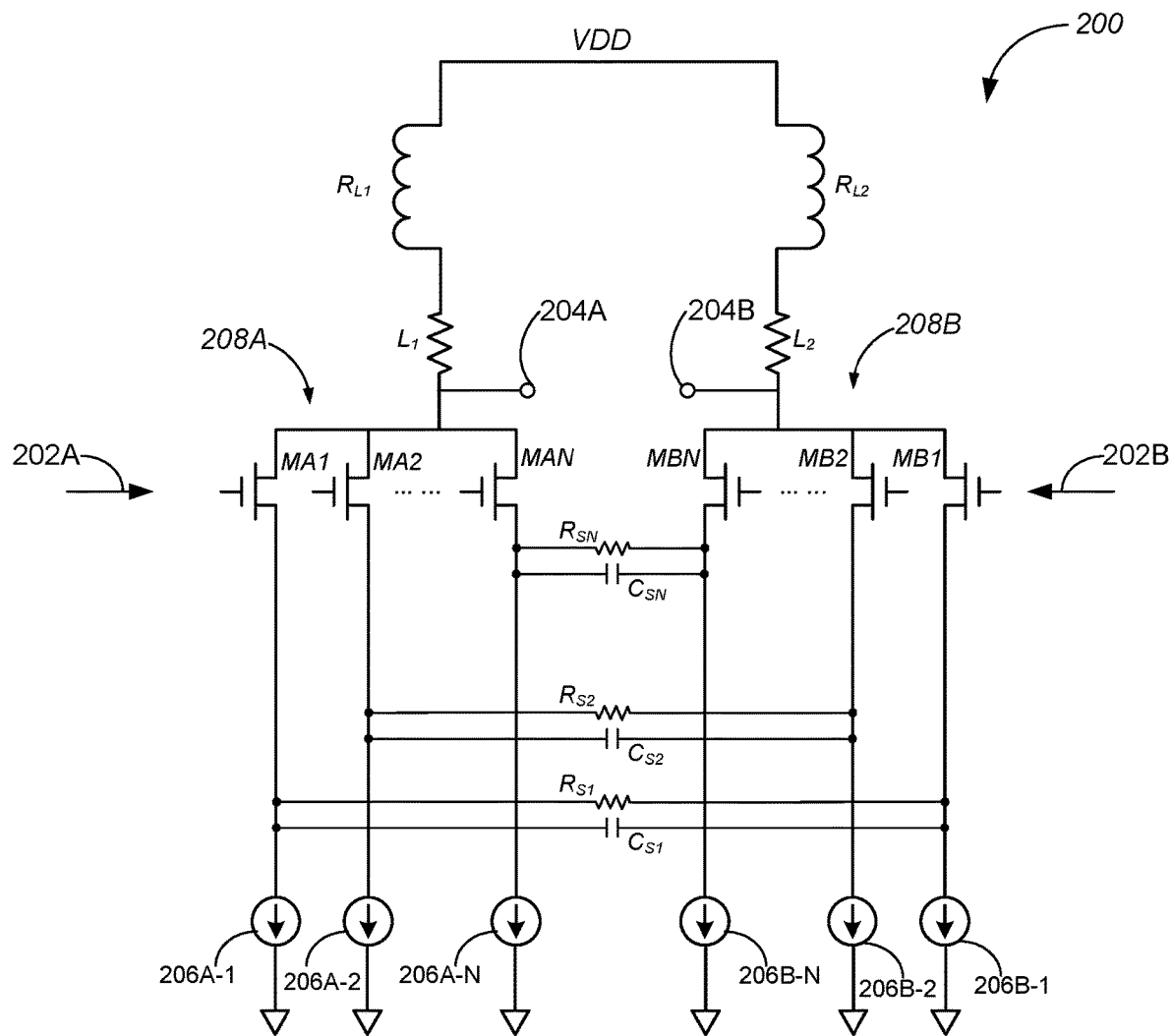
Figure 6B:
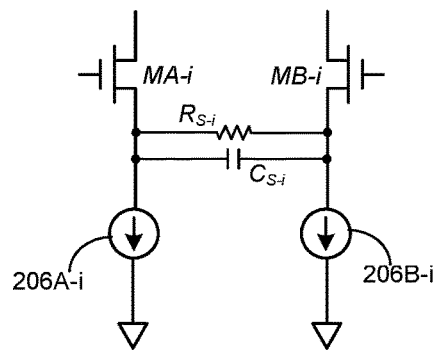

FIGS. 6A and 6B are schematic diagrams of two example CTLE circuit 200 including separate current source components for input transistors, in accordance with some implementations. The CTLE circuit 200 includes a current source 206 including a plurality of current source components (e.g., 206-1, 206-2, . . . 206-N in FIG. 6) and two differential transistor groups 208A and 208B coupled to the current source 206. The plurality of current source components are controlled to generate a bias current jointly in accordance with a data rate of data carried by the pair of differential input signals 202A and 202B. A subset of the two differential transistor groups 208A and 208B are controlled to be driven by the bias current and generate the pair of differential output signals 204A and 204B from the pair of differential input signals 202A and 202B. The two differential transistor groups include a first plurality of transistors 208A (MA1, MA2, . . . MAN) configured to receive a first input signal 202A and a second plurality of transistors 208B (MB1, MB2, . . . MBN) configured to receive a second input signal 202B. Drains of the first plurality of transistors 208A (MA1, MA2, . . . MAN) are coupled to each other, and drains of the second plurality of transistors 208B (MB1, MB2, . . . MBN) are coupled to each other.

Referring to FIG. 6A, in some implementations, a source of each of the first plurality of transistors 208A-i (MA-i) and a source of a respective one of the second plurality of transistors 208B-i (MB-i) are coupled to each other and further to a respective current source component 206-i. The two differential transistor groups 208A and 208B include a number (N) of input transistor pairs MA-i and MB-i, and sources of each input transistor pair are coupled to each other and to the respective current source component 206-i. Each input transistor pair MA-i and MB-i has a transistor size that matches a bias current portion provided by the respective current source component 206-i. In some implementations, the respective current source component 206-i is disabled, and the corresponding input transistor pair MA-i and MB-i are automatically deselected from generating the differential output signals 204A and 204B from the differential input signals 202A and 202B. Alternatively, in some implementations, bias voltage sources 500 of the corresponding input transistor pair MA-i and MB-i are controlled to provide the second predefined biasing voltage VCM2 to gates of the input transistor pair MA-i and MB-i. The input transistor pair MA-i and MB-i are turned off and deselected from generating the differential output signals 204A and 204B.

Referring to FIG. 6B, in some implementations, a source of each of the first plurality of transistors 208A-i (MA-i) and a source of a respective one of the second plurality of transistors 208B-i (MB-i) are coupled to each other via a respective source resistor Rs-i and a respective source capacitor $C_{S-i}$. The respective source resistor Rs-i and source capacitor $C_{S-i}$ are coupled in parallel with each other. The source of each of the first plurality of transistors 208A-i (MA-i) and the source of the respective one of the second plurality of transistors 208B-i (MB-i) are further coupled to a respective current source component 206A-i or 206B-i. The two differential transistor groups 208A and 208B include a number (N) of input transistor pairs MA-i and MB-i, and sources of each input transistor pair are coupled via the respective source resistor Rs-i and source capacitor $C_{S-i}$. The sources of each input transistor pair are coupled to the current source component 206A-i and 206B-i, respectively. Transistors of each input transistor pair MA-i and MB-i have the same transistor size, and the current source component 206A-i and 206B-i provide the same bias current portions that match the transistor size of the respective input transistor pair MA-i and MB-i.

Referring to FIGS. 6A and 6B, in some implementations, bias voltage sources 500 of the corresponding input transistor pair MA-i and MB-i are controlled by the control signal 210 to provide the second predefined biasing voltage VCM2 to gates of the input transistor pair MA-i and MB-i. The input transistor pair MA-i and MB-i are turned off and deselected from generating the differential output signals 204A and 204B. The corresponding current source 206-i (FIG. 6A) or the respective current source components 206A-i and 206B-i are automatically disabled. In some implementations, the respective current source 206-i (FIG. 6A) or the respective current source components 206A-i and 206B-i (FIG. 6B) are disabled by the control signal 210, and the corresponding input transistor pair MA-i and MB-i are automatically deselected from generating the differential output signals 204A and 204B from the differential input signals 202A and 202B.

In some implementations, a subset of the two differential transistor groups 208A and 208B is configured to be driven by the bias current to generate a pair of differential output signals 204A and 204B from the pair of differential input signals 202A and 202B. Each transistor of the subset of the two differential transistor groups 208A and 208B is selected, by applying the control signal 210 to enable (1) a respective bias voltage sources 500 to provide the first predefined biasing voltage VCM1 and (2) a respective current source 206-i (FIG. 6A) or respective current source components 206A-i and 206B-i (FIG. 6B) to generate a corresponding bias current portion. Each remaining transistor is distinct from any transistor of the subset of the two differential transistor groups 208A and 208B, and deselected by applying the control signal 210 to (1) enable a respective bias voltage source 500 to provide the second predefined biasing voltage VCM2, (2) disable a respective current source 206-i (FIG. 6A) or respective current source components 206A-i and 206B-i (FIG. 6B) from generating a corresponding bias current portion, or (3) both.

Figure 7:
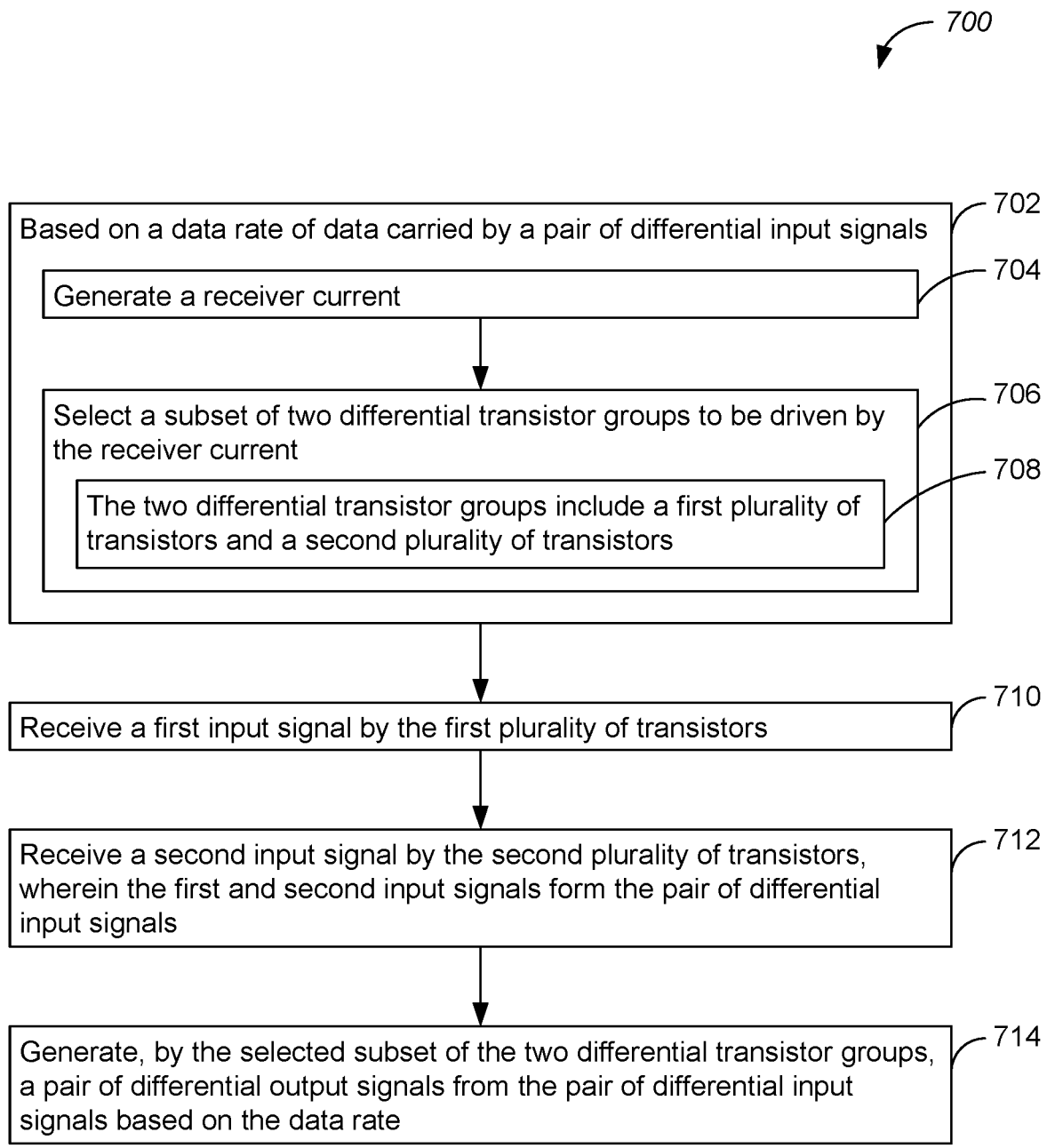
FIG. 7 is a flow diagram of an example method of conditioning a pair of differential input signals, in accordance with some implementations.

FIG. 7 is a flow diagram of an example method 700 of conditioning a pair of differential input signals 202A and 202B, in accordance with some implementations. The method 700 is implemented by an electronic device (e.g., a receiver device 118 having a CTLE circuit 200 or 250). Based on a data rate of data carried by a pair of differential input signals (702), the electronic device generates (704) a bias current; and selects (706) a subset of two differential transistor groups 208A and 208B to be driven by the bias current. The two differential transistor groups 208A and 208B include (708) a first plurality of transistors 208A (MA1, . . . , MAN) and a second plurality of transistors 208B (MB1, . . . , MBN). The electronic device receives a first input signal 202A by the first plurality of transistors 208A (710) and a second input signal 202B by the second plurality of transistors 208B (712). The first and second input signals 202A and 202B form the pair of differential input signals. The selected subset of the two differential transistor groups 208A and 208B generate (714) a pair of differential output signals 204A and 204B from the pair of differential input signals 202A and 202B based on the data rate.

Referring to FIG. 2A, in some implementations, sources of the first plurality of transistors 208A are coupled to each other and to the current source 206, and drains of the first plurality of transistors 208A are coupled to each other. Sources of the second plurality of transistors 208B are coupled to each other and to the current source 206, and drains of the second plurality of transistors 208B are coupled to each other.

In some implementations, the first plurality of transistors 208A include a first number of transistors, and the second plurality of transistors 208B include a second number of transistors. The second number is equal to the first number. Each of the first plurality of transistors 208A corresponds to and has the same size of a respective distinct one of the second plurality of transistors 208B. Further, in some implementations, each of the first plurality of transistors 208A and the second plurality of transistors 208B has a predefined transistor size, and a subset of the first plurality of transistors 208A are selected, such that a total size of the selected subset of the first plurality of transistors matches the bias current and the data rate. In some implementations, the subset of the two differential transistor groups 208A and 208B includes a first subset of the first plurality of transistors 208A and a second subset of the second plurality of transistors 208B that are identical to the first subset of the first plurality of transistors 208A.

Referring to FIGS. 3B-3D, in some implementations, each of the first plurality of transistors has a respective distinct transistor size. For example, in FIG. 3C, sizes of the first plurality of transistors 208A form a geometric sequence having a scale factor k, and are equal to W/L, kW/L, $k^2$W/L, $k^3$W/L, . . . , $k^{N-1}$W/L, where N represents the first number. In an example (FIG. 4), k is equal to 2, and a subset of the first plurality of transistors 208A are selected based on a binary scheme, such that a total size of the selected subset of the first plurality of transistors 208A matches the bias current and the data rate.

Referring to FIG. 4, in some implementations, a plurality of biasing circuits 402A and 402B are coupled to the two differential transistor groups 208A and 208B. Each biasing circuit 402A or 402B is coupled to a respective one of the first plurality of transistors (MA1, . . . , MAN) and the second plurality of transistors (MB1, MBN). Each biasing circuit 402A-i or 402B-i further includes a DC path coupled to a DC bias voltage source 500 (VCM-Ai) for the respective transistor and an input path coupled to a respective one of the first and second input signals 202A and 202B.

Further, in some implementations, each transistor of the two differential transistor groups 208A and 208B is configured to be (1) selected when the DC bias voltage source 500 of the respective biasing circuit 402A-i or 402B-i is electrically coupled to a first predefined biasing voltage level VCM1, and (2) deselected when the DC bias voltage source 500 of the respective biasing circuit 402A-i or 402B-i is electrically coupled to a second predefined biasing voltage level VCM2. For each transistor of the subset of the two differential transistor groups 208A and 208B, the DC bias voltage source 500 of the respective biasing circuit 402A-i or 402B-i is electrically coupled to the first predefined biasing voltage level VCM1, which turns on the corresponding selected transistor. For each remaining transistor of two differential transistor groups 208A and 208B, the DC bias voltage source 500 of the respective biasing circuit 402A-i or 402B-i is electrically coupled to the second predefined biasing voltage level VCM2, which keeps the remaining transistor off. Additionally, in some implementations, each transistor is an N-type MOSFET (FIGS. 2A-2B), and the first predefined biasing voltage level VCM1 is higher than the second predefined biasing voltage VCM2, and the second predefined biasing voltage VCM2 is configured to turn off the respective transistor. Alternatively, in some implementations, each transistor is a P-type MOSFET (FIG. 2C), and the first predefined biasing voltage level VCM1 is lower than the second predefined biasing voltage VCM2. The second predefined biasing voltage VCM2 is configured to turn off the respective transistor.

Referring to FIG. 4, in some implementations, the DC path of the biasing circuit 402A-i or 402B-i includes a resistor RAi or RBi coupled between the DC bias voltage source 500 and a gate of the respective transistor MA-i or MB-i. The input path includes at least a capacitor CAi or CBi coupled between a respective input signal 202A or 202B (i.e., VIA or VIB) and the gate of the respective transistor MA-i or MB-i. The respective input signal 202A or 202B is configured to receive the respective one of the first and second input signals 202A and 202B.

In some implementations, the first plurality of transistors 208A are configured to output a first output signal 204A and the second plurality of transistors 208B are configured to output a second output signal 204B. The first and second output signals 204A and 204B form the pair of differential output signals 204.

In some implementations, the electronic device is a receiver device 118 having a continuous time linear equalizer (CTLE) circuit 200 or 250 applied in a serializer/deserializer application.

In some implementations, each of the first plurality of transistors 208A and the second plurality of transistors 208B in the two differential transistor groups 208A and 208B is configured to maintain substantially constant DC operating points independently of the data rate.

Referring to FIGS. 2A and 2B, in some implementations, a controller 212 generates a control signal 210 according to the data rate of the data carried by the pair of differential input signals 204A or 204B. The CTLE circuit 200 or 250 optionally includes the controller 212 or is coupled to the controller 212. The control signal 210 enables a subset of the current source 206, the subset of the two differential transistor groups 208A or 208B, or both, such that the pair of differential output signals 204 are generated from the pair of differential input signals 202 based on the data rate of the data carried by the pair of differential input signals 202.

Referring to FIGS. 6A, in some implementations, the current source includes a plurality of current source components 206-i. Each current source component 206-i is configured to provide a respective bias current portion. Each of the first plurality of transistors 208A and the second plurality of transistors 208B is coupled with a respective current source component 206-i. Drains of the first plurality of transistors 208A are coupled to each other, and drains of the second plurality of transistors 208B are coupled to each other.

Figure 8:
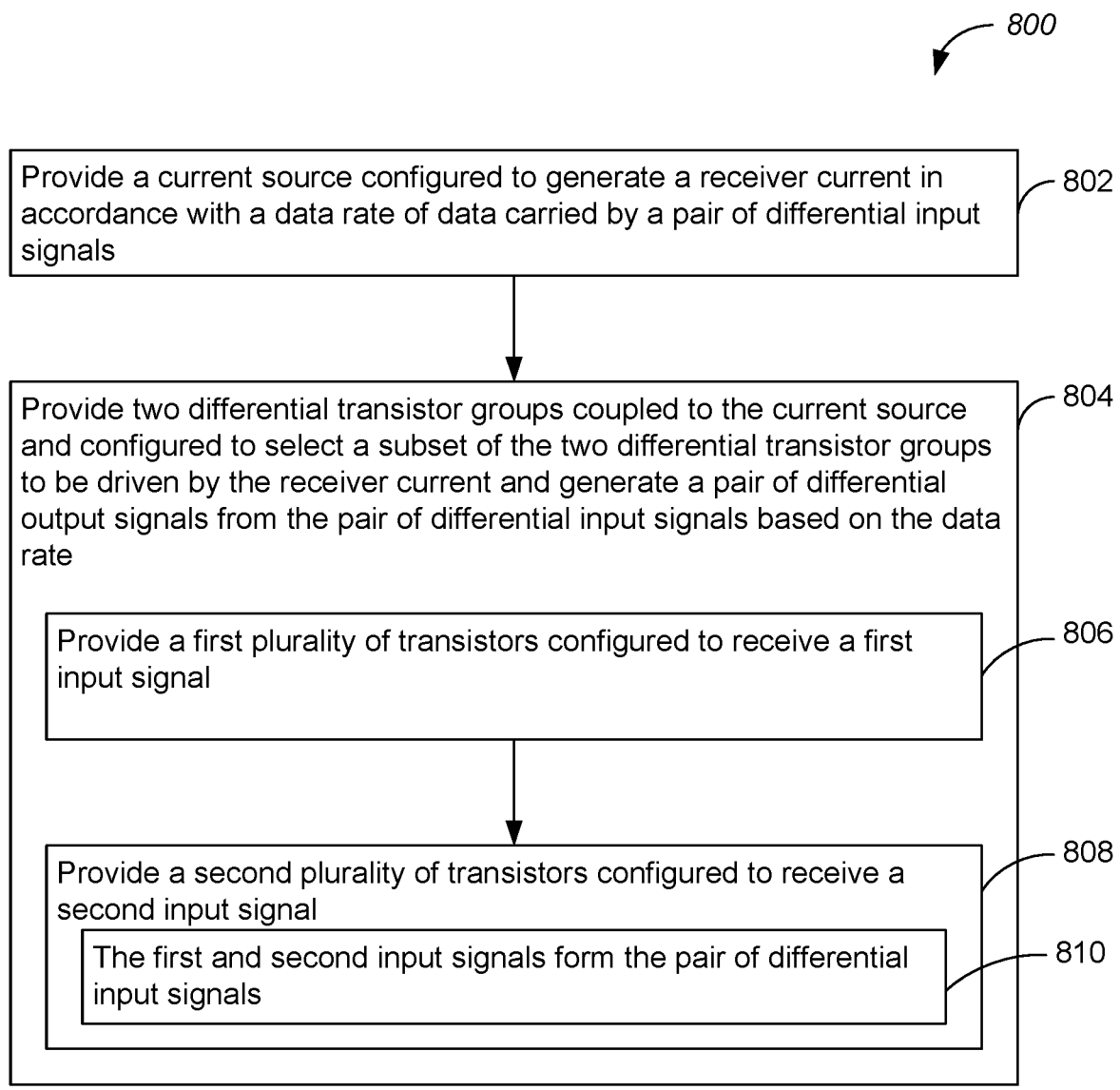
FIG. 8 is a flow diagram of an example method of providing an electronic device (e.g., a data link, a data interface, a CTLE circuit) for conditioning a pair of differential input signals, in accordance with some implementations.

FIG. 8 is a flow diagram of an example method 800 of providing an electronic device (e.g., a data link, a data interface, a CTLE circuit 200 or 250) for conditioning a pair of differential input signals, in accordance with some implementations. A current source 206 is provided (802) to generate a bias current in accordance with a data rate of data carried by a pair of differential input signals 202A and 202B. Two differential transistor groups 208A and 208B are provided (804) to be coupled to the current source and select a subset of the two differential transistor groups 208A and 208B to be driven by the bias current and generate a pair of differential output signals 204A and 204B from the pair of differential input signals 202A and 202B based on the data rate. Specifically, a first plurality of transistors 208A is provided (806) to receive a first input signal 202A, and a second plurality of transistors 208B is provided (808) to receive a second input signal 202B. The first and second input signals 202A and 202B form the pair of differential input signals 202A and 202B.

It should be understood that the particular order in which the operations in each of FIGS. 7 and 8 have been described are merely exemplary and are not intended to indicate that the described order is the only order in which the operations could be performed. One of ordinary skill in the art would recognize various ways to conditioning differential input signals of a data link 120 as described herein. Additionally, it should be noted that details of other processes described above with respect to FIGS. 1-6 are also applicable in an analogous manner to method 700 or 800 described above with respect to FIG. 7 or 8. For brevity, these details are not repeated here.

It will also be understood that, although the terms first, second, etc. are, in some instances, used herein to describe various elements, these elements should not be limited by these terms. These terms are only used to distinguish one element from another. For example, a first electronic device can be termed a second electronic device, and, similarly, a second electronic device can be termed a first electronic device, without departing from the scope of the various described implementations. The first electronic device and the second electronic device are both electronic device, but they are not the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An electronic device, comprising:
   a current source configured to generate a bias current in accordance with a data rate of data carried by a pair of differential input signals;
   two differential transistor groups coupled to the current source, wherein:
      a subset of the two differential transistor groups is configured to be driven by the bias current to generate a pair of differential output signals from the pair of differential input signals; and the two differential transistor groups include a first plurality of transistors configured to receive a first input signal and a second plurality of transistors configured to receive a second input signal, and the first and second input signals form the pair of differential input signals; and a controller configured to generate a multibit control signal enabling multiple distinct levels for the bias current according to the data rate of the data carried by the pair of differential input signals, the control signal being distinct from the pair of differential input signals, wherein the control signal is configured to select the subset of the two differential transistor groups proportional to the bias current, such that each of the first plurality of transistors and the second plurality of transistors in the two differential transistor groups maintains substantially constant DC operating points independently of the data rate to ensure consistent performance of the two differential transistor groups.

2. The electronic device of claim 1, wherein:
sources of the first plurality of transistors are coupled to each other and to the current source, and drains of the first plurality of transistors are coupled to each other; and
sources of the second plurality of transistors are coupled to each other and to the current source, and drains of the second plurality of transistors are coupled to each other.

3. The electronic device of claim 1, wherein:
the current source includes a plurality of current source components;
each current source component is configured to provide a respective bias current portion;
each of the first plurality of transistors and the second plurality of transistors is coupled with a respective current source component; and
drains of the first plurality of transistors are coupled to each other, and drains of the second plurality of transistors are coupled to each other.

4. The electronic device of claim 1, wherein:
the first plurality of transistors include a first number of transistors;
the second plurality of transistors include a second number of transistors, the second number equal to the first number; and
each of the first plurality of transistors corresponds to and has a same size of a respective distinct one of the second plurality of transistors.

5. The electronic device of claim 4, wherein each of the first plurality of transistors and the second plurality of transistors has a predefined transistor size, and a subset of the first plurality of transistors are selected, such that a total size of the selected subset of the first plurality of transistors matches the bias current and the data rate.

6. The electronic device of claim 4, wherein each of the first plurality of transistors has a respective distinct transistor size.

7. The electronic device of claim 6, wherein sizes of the first plurality of transistors form a geometric sequence having a scale factor k, and are equal to $W/L, kW/L, k^2 W/L, k^3 W/L, \ldots, k^{N-1} W/L$, where N represents the first number.

8. The electronic device of claim 7, wherein k is equal to 2, and a subset of the first plurality of transistors are selected based on a binary scheme, such that a total size of the selected subset of the first plurality of transistors matches the bias current and the data rate.

9. The electronic device of claim 4, wherein the subset of the two differential transistor groups includes a first subset of the first plurality of transistors and a second subset of the second plurality of transistors that are identical to the first subset of the first plurality of transistors.

10. The electronic device of claim 1, further comprising:
a plurality of biasing circuits coupled to the two differential transistor groups, wherein each biasing circuit is coupled to a respective one of the first plurality of transistors and the second plurality of transistors, and each biasing circuit further includes:
a DC path coupled to a DC bias voltage source for the respective transistor; and
an input path coupled to a respective one of the first and second input signals.

11. The electronic device of claim 10, wherein:
each transistor of the two differential transistor groups is configured to be (1) selected when a DC bias voltage source of a respective biasing circuit is electrically coupled to a first predefined biasing voltage level, and (2) deselected when the DC bias voltage source of the respective biasing circuit is electrically coupled to a second predefined biasing voltage level;
for each transistor of the subset of the two differential transistor groups, the DC bias voltage source of the respective biasing circuit is electrically coupled to the first predefined biasing voltage level; and
for each remaining transistor of two differential transistor groups, the DC bias voltage source of the respective biasing circuit is electrically coupled to the second predefined biasing voltage level.

12. The electronic device of claim 11, wherein each transistor is an N-type MOSFET, and the first predefined biasing voltage level is higher than the second predefined biasing voltage, and the second predefined biasing voltage is configured to turn off the respective transistor.

13. The electronic device of claim 11, wherein each transistor is a P-type MOSFET, and the first predefined biasing voltage level is lower than the second predefined biasing voltage, and the second predefined biasing voltage is configured to turn off the respective transistor.

14. The electronic device of claim 10, wherein the DC path includes a resistor coupled between the DC bias voltage source and a gate of the respective transistor, and the input path includes at least a capacitor coupled between a respective input and the gate of the respective transistor, the respective input configured to receive the respective one of the first and second input signals.

15. The electronic device of claim 1, wherein the first plurality of transistors are configured to output a first output signal and the second plurality of transistors are configured to output a second output signal, and the first and second output signals form the pair of differential output signals.

16. The electronic device of claim 1, wherein the electronic device is a receiver device having a continuous time linear equalizer (CTLE) applied in a serializer/deserializer application.

17. The electronic device of claim 3, wherein the control signal is configured to enable a subset of the current source, the subset of the two differential transistor groups, or both, such that the pair of differential output signals are generated from the pair of differential input signals based on the data rate of the data carried by the pair of differential input signals.

18. A method, comprising:
based on a data rate of data carried by a pair of differential input signals:

generating a bias current;
receiving a multibit control signal that is distinct from the pair of differential input signals; and
selecting, based on the control signal, a subset of two differential transistor groups to be driven by the bias current, wherein the two differential transistor groups include a first plurality of transistors and a second plurality of transistors, wherein the selected subset of the two differential transistor groups is proportional to the bias current, such that each of the first plurality of transistors and the second plurality of transistors in the two differential transistor groups maintains substantially constant DC operating points independently of the data rate to ensure consistent performance of the two differential transistor groups;
receiving a first input signal by the first plurality of transistors;
receiving a second input signal by the second plurality of transistors, wherein the first and second input signals form the pair of differential input signals; and
generating, by the selected subset of the two differential transistor groups, a pair of differential output signals from the pair of differential input signals based on the data rate.

19. A method, comprising:
providing a current source configured to generate a bias current in accordance with a data rate of data carried by a pair of differential input signals;
providing two differential transistor groups coupled to the current source and configured to select a subset of the two differential transistor groups to be driven by the bias current and generate a pair of differential output signals from the pair of differential input signals based on the data rate, further including:
providing a first plurality of transistors configured to receive a first input signal; and
providing a second plurality of transistors configured to receive a second input signal, wherein the first and second input signals form the pair of differential input signals; and
providing a controller coupled to the current source and the two differential transistor groups configured to generate a multibit control signal enabling multiple distinct levels for the bias current according to the data rate of the data carried by the pair of differential input signals, the control signal being distinct from the pair of differential input signals, wherein the control signal is configured to select the subset of the two differential transistor groups proportional to the bias current, such that each of the first plurality of transistors and the second plurality of transistors in the two differential transistor groups maintains substantially constant DC operating points independently of the data rate to ensure consistent performance of the two differential transistor groups.

20. The electronic device of claim 1, wherein the DC operating points of each of the first plurality of transistors and the second plurality of transistors in the two differential transistor groups are maintained substantially constant in a saturation region.

\* \* \* \* \*